United States Patent
Vernekar et al.

(10) Patent No.: US 12,104,664 B2
(45) Date of Patent: Oct. 1, 2024

(54) SYSTEMS AND METHODS FOR PROTECTING A SELECTABLE ONE-WAY CLUTCH OF A TRANSMISSION FROM HIGH SLIP-SPEED ENGAGEMENTS

(71) Applicant: GM GLOBAL TECHNOLOGY OPERATIONS LLC, Detroit, MI (US)

(72) Inventors: Pratik Nagesh Vernekar, Wixom, MI (US); Donald L Comis, Commerce, MI (US); Roberto Diaz, El Paso, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 79 days.

(21) Appl. No.: 18/176,735

(22) Filed: Mar. 1, 2023

(65) Prior Publication Data

US 2024/0295244 A1    Sep. 5, 2024

(51) Int. Cl.
*F16D 48/06* (2006.01)
*B60W 10/02* (2006.01)

(52) U.S. Cl.
CPC ......... *F16D 48/066* (2013.01); *B60W 10/023* (2013.01); *F16D 2500/10412* (2013.01); *F16D 2500/10493* (2013.01); *F16D 2500/30806* (2013.01); *F16D 2500/3101* (2013.01); *F16D 2500/3109* (2013.01); *F16D 2500/3115* (2013.01)

(58) Field of Classification Search
CPC ......... F16D 48/066; F16D 2500/10412; F16D 2500/10493; F16D 2500/30806; F16D 2500/3101; F16D 2500/3109; F16D 2500/3115; F16D 2500/1026; F16D 2500/30808; F16D 2500/31466; F16D 2500/50296; F16D 2500/5104; F16D 2500/70406; F16H 61/21; F16H 2061/1232; F16H 2061/1236
See application file for complete search history.

(56) References Cited

U.S. PATENT DOCUMENTS

| | | | |
|---|---|---|---|
| 2016/0040734 A1* | 2/2016 | Tamai | B60W 30/02 903/946 |
| 2017/0276238 A1* | 9/2017 | Lochocki, Jr. | F16H 61/12 |
| 2018/0066719 A1* | 3/2018 | Klaser | F16D 48/06 |
| 2018/0128328 A1* | 5/2018 | Diaz | F16D 41/125 |
| 2020/0032862 A1* | 1/2020 | Fedullo | F16D 48/06 |

* cited by examiner

*Primary Examiner* — Timothy Hannon
(74) *Attorney, Agent, or Firm* — Lorenz & Kopf LLP

(57) ABSTRACT

Systems and methods are provided for controlling a transmission of a vehicle that has a selectable one-way clutch. The system includes a sensor system, an anti-lock brake system (ABS), and a controller configured to, by a processor: monitor for a deceleration event wherein an estimated output speed acceleration of the vehicle is reduced below a first threshold, receive a status of the ABS, and output one or more control signals to command the transmission to inhibit the application of the selectable one-way clutch in response to detection of the deceleration event when the selectable one-way clutch is not applied, and the estimated output speed acceleration of the vehicle is either: (i) below the first threshold while the anti-lock brake system ABS of the vehicle is active, or (ii) below a second threshold while the ABS is inactive, wherein the first threshold is greater than the second threshold.

20 Claims, 8 Drawing Sheets

SYSTEMS AND METHODS FOR PROTECTING A SELECTABLE ONE-WAY CLUTCH OF A TRANSMISSION FROM HIGH SLIP-SPEED ENGAGEMENTS

INTRODUCTION

The technical field generally relates to control of a transmission having a selectable one-way clutch, and more particularly relates to systems and methods that control application of the selectable one-way clutch to reduce a likelihood of high slip-speed engagements.

Automatic transmissions generally provide a plurality of forward and reverse speed or gear ratios by selectively actuating one or more mechanical diodes along with other friction elements. One type of mechanical diode is a selectable one-way clutch which includes a "locked" mode in one rotational direction and a "freewheel" mode in the opposite rotational direction. Unlike a basic one-way clutch in which the operating mode is determined by the direction of the torque being applied to an input member, a selectable one-way clutch is capable of producing a driving connection between an input member and an output member in one or both rotational directions and is also able to freewheel in one rotational direction as needed. As an example, a selectable one-way clutch may be implemented to transfer torque from an engine to the transmission, and to interrupt the transfer of reverse torque from the transmission to the engine.

Typical selectable one-way clutches in automatic transmissions often employ a high pressure hydraulic control system or an electrical control system that is used to actuate the selectable one-way clutch. For hydraulic control systems, issues may arise due to the inherent hydraulic delay in response to changing circumstances. For example, a medium-to-heavy deceleration event with wheel lock-up can cause damage to a selectable one-way clutch due to high slip-speed engagement. During these wheel lock-up and deceleration events, the output speed drops low enough to show that the slip speed for the selectable one-way clutch is within a strut engagement window. Subsequent reduced braking and regaining traction when the selectable one-way clutch is commanded ON can cause a high slip-speed engagement and break the struts of the selectable one-way clutch.

Accordingly, it is desirable to provide systems and methods capable of reducing the likelihood of high speed-slip engagements of selectable one-way clutches during deceleration events. Furthermore, other desirable features and characteristics of the present invention will become apparent from the subsequent detailed description and the appended claims, taken in conjunction with the accompanying drawings and the foregoing technical field and background.

SUMMARY

A system is provided for controlling a transmission of a vehicle that has a selectable one-way clutch. In one embodiment, the system includes a sensor system having one or more sensors configured to sense an observable condition of the vehicle, an anti-lock brake system (ABS), and a controller configured to, by a processor: monitor for a deceleration event wherein an estimated output speed acceleration of the vehicle, determined based on the observable condition sensed by the sensor system, is reduced below a first threshold, receive a status of the anti-lock brake system (ABS) of the vehicle indicating whether the anti-lock brake system (ABS) is active or inactive, and output one or more control signals to command the transmission to inhibit the application of the selectable one-way clutch in response to detection of the deceleration event when the selectable one-way clutch is not applied, and the estimated output speed acceleration of the vehicle is either: (i) below the first threshold while the anti-lock brake system (ABS) of the vehicle is active, or (ii) below a second threshold while the ABS is inactive, wherein the first threshold is greater than the second threshold.

In various embodiments, the controller is configured to, by the processor: calculate the estimated output speed acceleration of the vehicle based on the observable condition sensed by the sensor system, receive sensed wheel speed for wheels of the vehicle, and receive dynamic vehicle test (DVT) information.

In various embodiments, one or more of the control signals are configured to: reduce a hydraulic pressure of a hydraulic circuit of the vehicle such that the selectable one-way clutch is transitioned to a release position wherein a strut of the selectable one-way clutch is not engaged, and disable a capability of changing the hydraulic pressure after the hydraulic pressure is reduced.

In various embodiments, the controller is configured to, by the processor: change a gear state of the transmission by setting or overriding a commanded gear state of the transmission to neutral with no clutches applied when a range selection device configured to select an operating range of the transmission is set to neutral and a scheduled gear state of the transmission is neutral with the selectable one-way clutch engaged or applied, or change the gear state by setting or overriding the commanded gear state of the transmission to first gear freewheel when the range selection device is set to drive and the scheduled gear state of the transmission is first gear locked.

In various embodiments, the controller is configured to, by the processor, output one or more additional control signals to command the transmission to provide engine braking by changing a gear state of the transmission in response to outputting the one or more control signals.

In various embodiments, the transmission includes a Manual mode configured to allow an operator to manually change the gear state of the transmission, wherein the controller is configured to, by the processor, change the gear state by setting or overriding a commanded gear state of the transmission to second gear when the Manual mode is active, a gear range of the transmission is first gear manual (M1), a scheduled gear state of the transmission is first gear freewheel, and an attained gear state of the transmission is less than or equal to second gear.

In various embodiments, after setting or overriding the commanded gear state of the transmission to second gear, the controller is configured to, by the processor, execute a change-of-mind or return-to-previous-range command to command the transmission to second gear when the commanded gear state is first gear freewheel.

In various embodiments, after setting or overriding the commanded gear state of the transmission to second gear, the controller is configured to, by the processor, to end the setting or overriding of the commanded gear state of the transmission to second gear when the attained gear state of the transmission is greater than second gear, the Manual mode is active, and the Manual mode gear range is greater than second gear manual (M2).

In various embodiments, the controller is configured to, by the processor: initiate an overall event timer in response to automatically inhibiting the application of the selectable one-way clutch, initiate a hysteresis timer if the estimated output speed acceleration is greater than a third threshold, monitor for a selection of a gear range of reverse and a commanded gear state of reverse, and output one or more additional control signals to command the transmission to cease inhibition of the application of the selectable one-way clutch in response to the overall event timer being greater than or equal to an overall event timeout threshold, the hysteresis timer being greater than or equal to a hysteresis timeout threshold, or the detection of the selection of the gear range of reverse and the commanded gear state of reverse.

A method is provided for a vehicle having a transmission with a selectable one-way clutch. In one embodiment, the method includes receiving an observable condition of the vehicle sensed by the sensor system, receiving a status of an anti-lock brake system (ABS) of the vehicle indicating whether the anti-lock brake system (ABS) is active or inactive, monitoring, by a processor, for a deceleration event wherein an estimated output speed acceleration of the vehicle, determined based on the observable condition sensed by the sensor system, is reduced below a first threshold, and outputting, by the processor, one or more control signals to command the transmission to inhibit the application of the selectable one-way clutch in response to detection of the deceleration event when the selectable one-way clutch is not applied, and the estimated output speed acceleration of the vehicle is either: (i) below the first threshold while the anti-lock brake system (ABS) of the vehicle is active, or (ii) below a second threshold while the ABS is inactive, wherein the first threshold is greater than the second threshold.

In various embodiments, the step of monitoring for the deceleration event includes: calculating, by the processor, the estimated output speed acceleration of the vehicle based on the observable condition sensed by the sensor system, receiving, by the processor, sensed wheel speed for wheels of the vehicle, and receiving, by the processor, dynamic vehicle test (DVT) information.

In various embodiments, one or more of the control signals are configured to: reduce a hydraulic pressure of a hydraulic circuit of the vehicle such that the selectable one-way clutch is transitioned to a release position wherein a strut of the selectable one-way clutch is not engaged, and disable a capability of changing the hydraulic pressure after the hydraulic pressure is reduced.

In various embodiments, changing the gear state includes: setting or overriding, by the processor, a commanded gear state of the transmission to neutral with no clutches applied when a range selection device configured to select an operating range of the transmission is set to neutral and a scheduled gear state of the transmission is neutral with the selectable one-way clutch engaged or applied, or setting or overriding, by the processor, the commanded gear state of the transmission to first gear freewheel when the range selection device is set to drive and the scheduled gear state of the transmission is first gear locked.

In various embodiments, the method includes outputting, by the processor, one or more additional control signals to command the transmission to provide engine braking by changing a gear state of the transmission in response to outputting the one or more control signals.

In various embodiments, the transmission includes a Manual mode configured to allow an operator to manually change the gear state of the transmission, wherein changing the gear state includes setting or overriding, by the processor, a commanded gear state of the transmission to second gear when the Manual mode is active, a gear range of the transmission is first gear manual (M1), a scheduled gear state of the transmission is first gear freewheel, and an attained gear state of the transmission is less than or equal to second gear.

In various embodiments, after setting or overriding the commanded gear state of the transmission to second gear, the method includes executing, by the processor, a change-of-mind or return-to-previous-range command to command the transmission to second gear when the commanded gear state is first gear freewheel.

In various embodiments, after setting or overriding the commanded gear state of the transmission to second gear, the method includes ending, by the processor, the setting or overriding of the commanded gear state of the transmission to second gear when the attained gear state of the transmission is greater than second gear, the Manual mode is active, and the Manual mode gear range is greater than second gear manual (M2).

In various embodiments, the method includes initiating, by the processor, an overall event timer in response to automatically inhibit the application of the selectable one-way clutch, initiating, by the processor, a hysteresis timer if the estimated output speed acceleration is greater than a third threshold, monitoring, by the processor, for a selection of a gear range of reverse and a commanded gear state of reverse, and outputting, by the processor, one or more additional control signals to command the transmission to cease inhibition of the application of the selectable one-way clutch in response to the overall event timer being greater than or equal to an overall event timeout threshold, the hysteresis timer being greater than or equal to a hysteresis timeout threshold, or the detection of the selection of the gear range of reverse and the commanded gear state of reverse.

A vehicle is provided that includes a transmission having a selectable one-way clutch, a sensor system having one or more sensors configured to sense an observable condition of the vehicle, an anti-lock brake system (ABS), and a controller configured to, by a processor: monitor for a deceleration event wherein an estimated output speed acceleration of the vehicle, determined based on the observable condition sensed by the sensor system, is reduced below a first threshold, receive a status of the anti-lock brake system (ABS) of the vehicle indicating whether the anti-lock brake system (ABS) is active or inactive, and output one or more control signals to command the transmission to inhibit the application of the selectable one-way clutch in response to detection of the deceleration event when the selectable one-way clutch is not applied, and the estimated output speed acceleration of the vehicle is either: (i) below the first threshold while the anti-lock brake system (ABS) of the vehicle is active, or (ii) below a second threshold while the ABS is inactive, wherein the first threshold is greater than the second threshold.

In various embodiments, the transmission includes a hydraulic circuit configured for transitioning the selectable one-way clutch between a release position wherein a strut of the selectable one-way clutch is not engaged and an apply position wherein the strut of the selectable one-way clutch is engaged, wherein the one or more control signals are configured to: reduce the hydraulic pressure such that the selectable one-way clutch is transitioned to the release position, disable the capability of changing the hydraulic pressure after the hydraulic pressure has been reduced, and provide engine braking by changing a gear state of the transmission.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
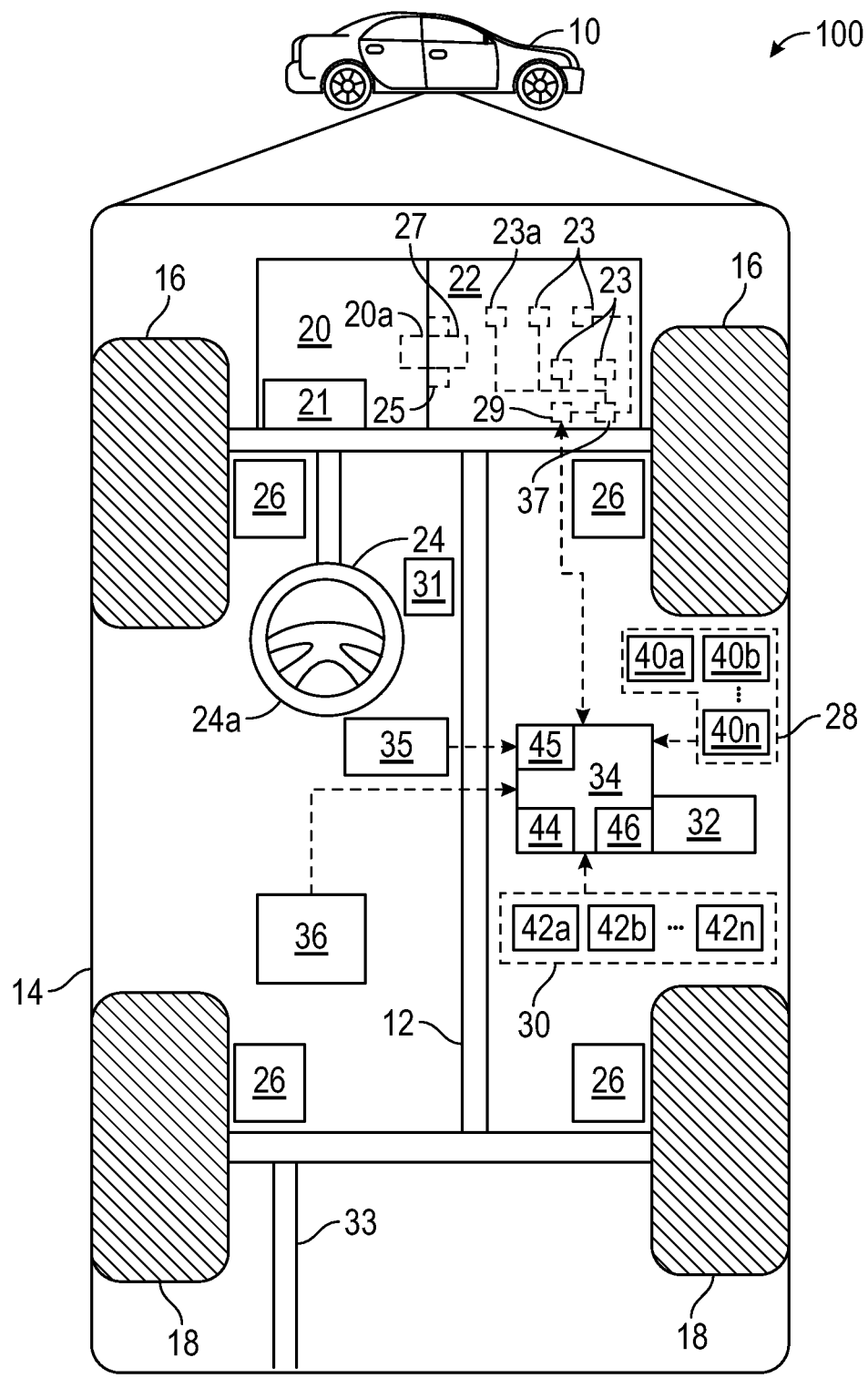
FIG. 1 is a functional block diagram of a vehicle that includes a high slip-speed engagement prevention system, in accordance with various embodiments.

FIG. 1 illustrates a vehicle 10, according to an exemplary embodiment that includes a transmission control system 100. In general, the system 100 generates one or more control signals to a transmission or transmission system 22 of the vehicle 10 to command one or more clutches 23 to operate in a manner that reduces the likelihood of high slip-speed engagements during deceleration events with wheel lock-up. In certain embodiments, the vehicle 10 comprises an automobile. In various embodiments, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In addition, in various embodiments, it will also be appreciated that the vehicle 10 may comprise any number of other types of mobile platforms.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

The vehicle 10 further includes a propulsion system 20, the transmission system 22, a steering system 24, a brake system 26, an exhaust system 33, a sensor system 28, an actuator system 30, at least one data storage device 32, at least one controller 34, and an anti-lock brake system (ABS) 36. The propulsion system 20 includes an engine 21, such as a gasoline or diesel fueled combustion engine, an electric engine, or a hybrid engine. The propulsion system 20 generally has an output shaft or crankshaft 20a, which is coupled to the transmission system 22.

The transmission system 22 is configured to transmit power from the propulsion system 20 to the wheels 16-18 according to selectable speed ratios based on a range selection received from a human-machine interface, for example, a range selection device 35 (e.g., gear selector, gear shifter, PRNDL, etc.) configured to select an operating range (e.g., gear ratio). The transmission system 22 includes a torque converter 25, which is coupled to the crankshaft 20a of the propulsion system 20. The torque converter 25 enables the propulsion system 20 to move independently of the transmission system 22, and uses torque received from the crankshaft 20a to drive an input shaft 27 of the transmission system 22. The transmission system 22 includes various gears, planetary gear sets, and the clutches 23. The clutches 23 are hydraulically operated and are in fluid communication with a pressurized hydraulic fluid source. The clutches 23 are coupled to the hydraulic fluid source via control valves 37, which regulate the engagement or disengagement of the respective clutch 23 by supplying pressure to the respective clutch 23 to engage the respective clutch 23 or discharging pressure from the respective clutch 23 to disengage the respective clutch 23. The control valves 37 are responsive to control signals received from a transmission controller 29 to supply or discharge the pressure to/from the respective clutch 23. At least one of the clutches 23 is a selectable one-way clutch (SOWC) 23a.

The range selection device 35 comprises any user input device that enables an operator to input an operating range for the transmission system 22, such as park, reverse, neutral, drive and low, including, but not limited to, switches, buttons, levers, etc. Those skilled in the art may realize other techniques to implement the range selection device 35 in the vehicle 10. In some embodiments, the range selection device 35 may include a manual input device. In such embodiments, the transmission controller 29 may include a manual mode wherein an operator may use the manual input device to manually change or change a limit of the gear state of the transmission 22. The range selection device 35 is in communication with the controller 34 over a communication medium, and provides the input range selection to the controller 34.

The transmission controller 29 includes at least one processor and a computer-readable storage device or media. The processor may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the transmission controller 29, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the transmission controller 29 in controlling the transmission system 22.

In various embodiments, the transmission controller 29 includes a gear shifting schedule that includes information relating to desired gear states based on, for example, operational conditions of the vehicle 10 and/or operator input. The transmission controller 29 may determine a desired gear state from the gear shifting schedule based on, for example, a throttle position and wheel speed, and generate one or more control signals configured to, based on preprogrammed sequencing logic, apply and/or release one or more of the clutches 23 to attain the desired gear state. As used herein, the desired gear contained in the one or more control signals is referred to as a commanded gear, and a current gear state of the transmission 22 is referred to as an attained gear state. In various embodiments, the transmission 22 may be capable of a change-of-mind command and/or return to previous range command. As used herein, the "change-of-mind" command refers to a change in the commanded gear state before the completion of a prior commanded gear state is attained (i.e., a prior-requested but not yet fully-executed shift), and the "return-to-previous-range" command refers to a change in the commanded gear state to a previously attained gear state before the completion of a prior commanded gear state is attained.

In this example, the transmission system 22 includes several clutches 23, which cooperate to enable a range selection. In this regard, some of the clutches 23 are selectively engaged in order to provide one or more reverse drive ratios and one or more forward drive ratios. In this example, the transmission system 22 is a front wheel drive transmission, which includes multiple forward drive gear ratios, such as but not limited to, first gear, second gear, third gear, fourth gear, fifth gear, sixth gear, seventh gear, eighth gear, etc. as well as both freewheel and locked versions for at least one of the gears, such as first gear, depending on which of the clutches 23 are selectable one-way clutches.

The steering system 24 influences a position of the wheels 16-18. While depicted as including a steering wheel 24a for illustrative purposes, in some embodiments contemplated within the scope of the present disclosure, the steering system 24 may not include a steering wheel. In various embodiments, the range selection device 35 may be incorporated into the steering wheel 24a, for example, the steering wheel 24a may include buttons, switches, or the like configured to be manually actuated to change the gear of the transmission 22.

The brake system 26 is configured to provide braking torque to the wheels 16-18. The brake system 26 may, in various embodiments, include friction brakes, brake by wire, a regenerative braking system such as an electric machine, and/or other appropriate braking systems. In one example, the vehicle 10 includes a brake pedal 31, which is movable by the operator from a released position into a depressed position to activate the brake system 26 to apply the braking torque.

The sensor system 28 includes one or more sensing devices 40a-40n that sense observable conditions of the exterior environment, the interior environment, and/or a status or condition of a corresponding component of the vehicle 10 and provide such condition and/or status to other systems of the vehicle 10, such as the controller 34. It should be understood that the vehicle 10 may include any number of the sensing devices 40a-40n. The sensing devices 40a-40n can include, but are not limited to, transmission speed sensors, temperature sensors, shift lever switch sensors, throttle position sensors, vehicle speed sensors, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components, and the like.

The data storage device 32 stores data for use in controlling the vehicle 10 and/or systems and components thereof. As can be appreciated, the data storage device 32 may be part of the controller 34, separate from the controller 34, or part of the controller 34 and part of a separate system. The data storage device 32 can be any suitable type of storage apparatus, including various different types of direct access storage and/or other memory devices. In one exemplary embodiment, the data storage device 32 comprises a program product from which a computer readable memory device can receive a program that executes one or more embodiments of one or more processes of the present disclosure, such as the steps of the process discussed further below in connection with FIGS. 3-7. In another exemplary embodiment, the program product may be directly stored in and/or otherwise accessed by the memory device and/or one or more other disks and/or other memory devices.

The controller 34 includes at least one processor 44, a communication bus 45, and a computer readable storage device or media 46. The processor 44 performs the computation and control functions of the controller 34. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM). For example, KAM is a persistent or non-volatile memory that may be used to store various operating variables while the processor 44 is powered down. The computer-readable storage device or media 46 may be implemented using any number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms, and generate data based on the logic, calculations, methods, and/or algorithms. Although only one controller 34 is shown in FIG. 1, embodiments of the vehicle 10 can include any number of controllers 34 that communicate over any suitable communication medium or a combination of communication mediums that cooperate to process the sensor signals, perform logic, calculations, methods, and/or algorithms, and generate data.

As can be appreciated, that the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

The ABS 36 is configured to reduce the likelihood of the wheels 16-18 from locking up during a braking event (i.e., application of the brake system 26), thereby maintaining tractive contact with the road and promote control over the vehicle 10. The ABS 36 may include a central electronic control unit (ECU), four wheel speed sensors, and at least two hydraulic valves within brake hydraulics of the vehicle 10. The ECU constantly monitors the rotational speed of each of the wheels 16-18. If the ECU detects that the wheels 16-18 are rotating significantly slower than the speed of the vehicle 10, a condition indicative of impending wheel lock, the ECU actuates the hydraulic valves to reduce hydraulic pressure to the brake system 26 at the affected wheels 16-18, thus reducing the braking force on the wheels 16-18 and allowing the wheels 16-18 to rotate faster. Conversely, if the ECU detects one of the wheels 16-18 turning significantly faster than the others, brake hydraulic pressure to the corresponding wheel 16-18 is increased so the braking force is reapplied, slowing down the corresponding wheel 16-18.

Figure 2:
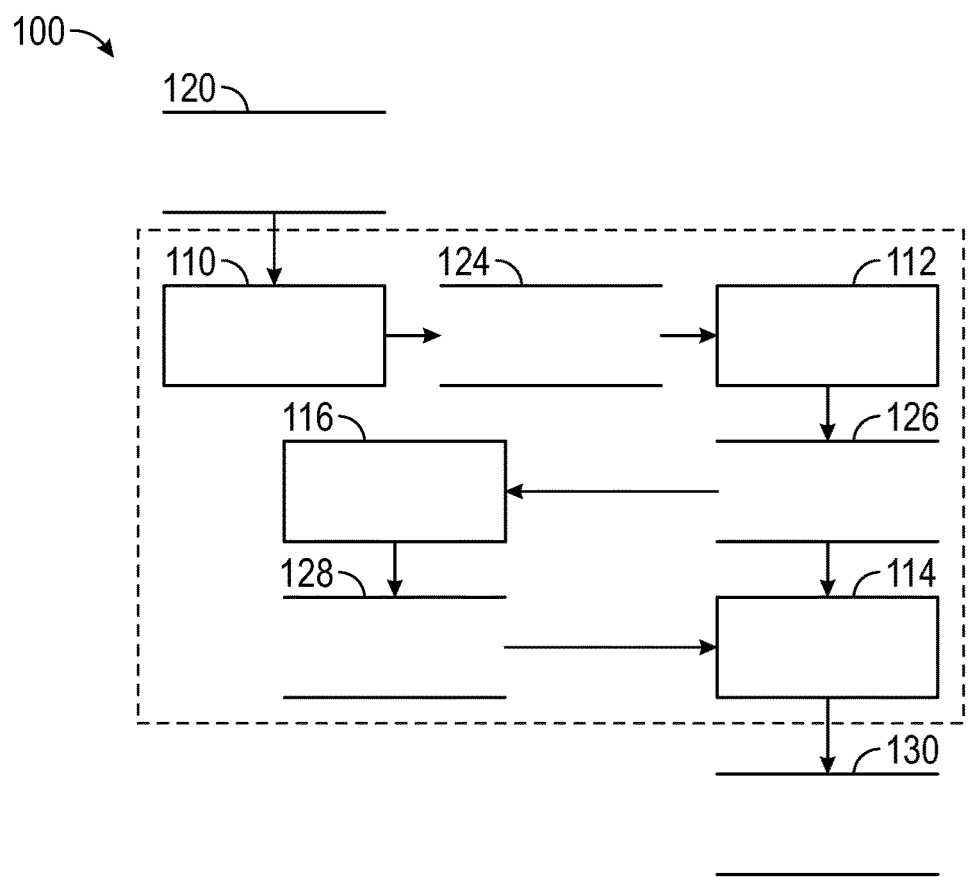
FIG. 2 is a dataflow diagram illustrating elements of the of system of the vehicle of FIG. 1, in accordance with various embodiments.

With reference to FIG. 2 and with continued reference to FIG. 1, a dataflow diagram illustrates elements of the system 100 of FIG. 1 in accordance with various embodiments. As can be appreciated, various embodiments of the system 100 according to the present disclosure may include any number of modules embedded within the controller 34 which may be combined and/or further partitioned to similarly implement systems and methods described herein. Furthermore, inputs to the system 100 may be received from other control modules (not shown) associated with the vehicle 10, and/or determined and/or modeled by other sub-modules (not shown) within the controller 34. Furthermore, the inputs might also be subjected to preprocessing, such as sub-sampling, noise-reduction, normalization, feature-extraction, missing data reduction, and the like. In various embodiments, the system 100 includes an analysis module 110, a decision module 112, a gear control module 114, and a timeout module 116.

In various embodiments, the analysis module 110 receives as input vehicle data 120 generated by the sensor system 28, the ABS 36, a diagnostic system of the vehicle 10, the transmission controller 29, the data storage device 32, and/or another source. The vehicle data 120 includes various data indicating operational conditions of the vehicle 10, such as dynamic vehicle testing (DVT) data, information sensed by the sensor system 28 (e.g., wheel speed sensors, transmission input and/or output speed sensors, etc.), information received from the ABS 36, etc.

The analysis module 110 monitors operation of the vehicle 10 to detect deceleration events by continuously receiving and analyzing the vehicle data 120. In some embodiments, the analysis module 110 may estimate an output speed acceleration of the vehicle 10, status of the ABS 36, wheels speeds, and/or DVT data to detect deceleration events. The analysis module 110 generates analysis data 124 that includes various data indicating detection of a deceleration event and certain operational conditions of the vehicle 10.

In various embodiments, the decision module 112 receives as input the analysis data 124 generated by the analysis module 110. The decision module 112 performs an analysis of the analysis data 124 and determines what actions should be performed, if any, in response to the detection of the deceleration event, such as disabling the selectable one-way clutch 23a and/or changing the gear state of the transmission 22. The decision module 112 generates decision data 126 that includes various data indicating the desired actions, if any, in response to the detection of the deceleration event.

In various embodiments, the gear control module 114 receives as input decision data 126 generated by the decision module 112. The gear control module 114 performs an analysis of the decision data 126 and generates transmission control data 130 that includes various data indicating commands configured to cause performance of the desired actions by, for example, the transmission 22.

In various embodiments, the timeout module 116 receives as input the decision data 126 generated by the decision module 112. The timeout module 116 performs an analysis of the decision data 126 and initiates or updates one or more timers based thereon, monitors the timer(s), and determines whether to cease inhibition of the selectable one-way clutch 23a. The timeout module 116 generates timeout data 128 that includes various data indicating whether to cease inhibition of the selectable one-way clutch 23a and allow normal operation thereof. As used herein, normal operation of the selectable one-way clutch 23a refers to operation based on preprogrammed control logic of the transmission controller 29 that operates the transmission system 22 to transmit power from the propulsion system 20 to the transmission system 22, such as the sequencing logic of the gear shifting schedule.

In various embodiments, the gear control module 114 receives as input timeout data 128 generated by the timeout module 116. The gear control module 114 performs an analysis of the timeout data 128 and, if the timeout data 128 indicates that the selectable one-way clutch 23a should resume normal operation, the gear control module 114 generates the transmission control data 130 that, in this instance, includes various data indicating commands configured to cause the selectable one-way clutch 23a to resume normal operation.

Figure 3:
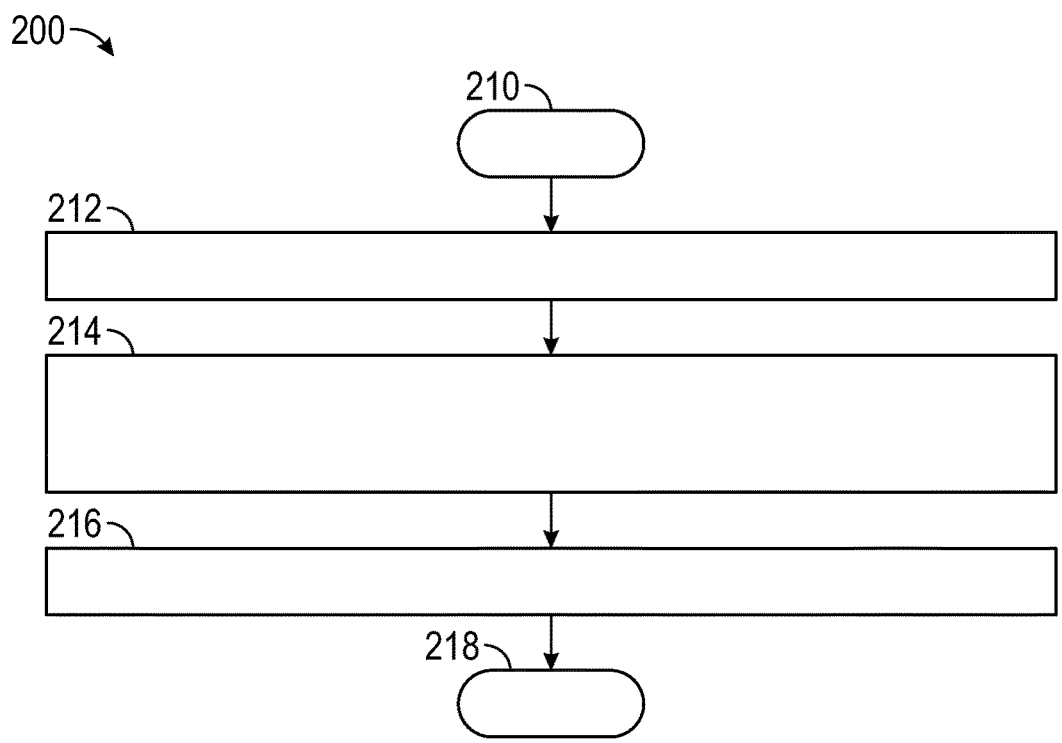
FIG. 3 is a flowchart of a method for reducing the likelihood of high slip-speed engagement of a selectable one-way clutch as performed by the system of the vehicle of FIGS. 1 and 2, in accordance with exemplary embodiments.

With reference now to FIG. 3 and with continued reference to FIGS. 1-2, a flowchart provides a control method 200 for reducing the likelihood of high slip-speed engagement of the selectable one-way clutch 23a as performed by the system 100, in accordance with exemplary embodiments. As can be appreciated in light of the disclosure, the order of operation within the method 200 is not limited to the sequential execution as illustrated in FIG. 3, but may be performed in one or more varying orders as applicable and in accordance with the present disclosure. In various embodiments, the method 200 can be scheduled to run based on one or more predetermined events, and/or can run continuously during operation of the vehicle 10.

In one example, the method 200 may start at 210. At 212, the method 200 may include monitoring for a deceleration event that may result in a high slip-speed engagement of the selectable one-way clutch 23a. For example, the method 200 may include monitoring for a deceleration event wherein an estimated output speed acceleration of the vehicle 10 is reduced to an extent sufficient to allow application of the selectable one-way clutch 23a (e.g., within a preprogrammed engagement window of the selectable one-way clutch 23a). In some embodiments, such deceleration events may be detected by an estimated output speed acceleration of the vehicle 10, a status of the ABS 36, wheels speeds, and/or dynamic vehicle testing data. Upon detection of a deceleration event of these types, the method 200 may include automatically outputting one or more control signals to command the transmission 22 to inhibit, restrict, prevent, and/or disable application of the selectable one-way clutch 23a in response to detection of the deceleration event at 214. After the deceleration event has ended or another exit criteria has been met, the method 200 may include outputting one or more additional control signals to command the transmission 22 to cease inhibition of the selectable one-way clutch 23a, that is, resume normal operation of the selectable one-way clutch 23a at 216. The method 200 may end at 218.

FIGS. 4-7 present exemplary details that may be implemented into the method 200 of FIG. 3. For convenience, FIG. 8 presents a plot depicting estimated output speed acceleration (y-axis; 610) relative to time (x-axis; 612) during an exemplary deceleration event of the vehicle 10. The estimated output speed acceleration over time is illustrated by a line 620. FIG. 8 identifies nonlimiting examples of various thresholds discussed below.

Figure 4:
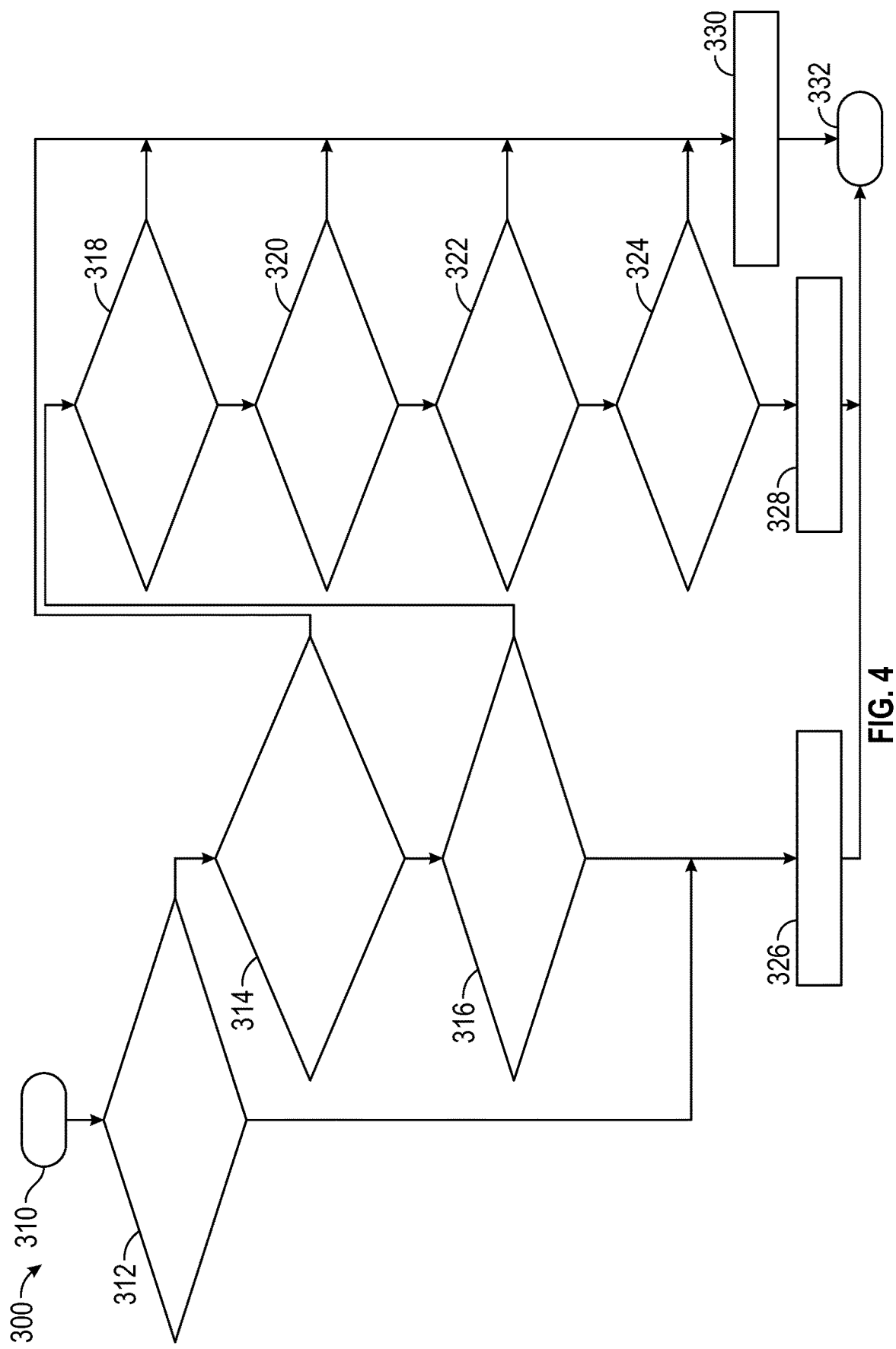
FIG. 4 is a flowchart of a method for determining whether to inhibit application of the selectable one-way clutch in response to detection of the deceleration event as performed by the system of the vehicle of FIGS. 1 and 2, in accordance with exemplary embodiments.

Referring to FIG. 4, a method 300 is presented for determining whether to inhibit application of the selectable one-way clutch 23a in response to detection of the deceleration event. The method 300 may start at 310, for example, upon detection of the deceleration event. At 312, a determination is made regarding a status of the selectable one-way clutch 23a. If the selectable one-way clutch 23a is currently applied, then there is no risk of a high slip-speed engagement. Therefore, a selectable one-way clutch inhibiting command (labeled Boolean B1 in FIGS. 4-6) may be set to FALSE at 326, and the selectable one-way clutch 23a may function normally.

If the selectable one-way clutch 23a is not currently applied, a determination is made at 314 regarding a status of the ABS 36 and a comparison is made between an estimated output speed acceleration of the vehicle 10 and a first threshold ($K_1$; 630 in FIG. 8). In some embodiments, the method 300 includes calculating the estimated output speed acceleration. In some embodiments, the first threshold ($K_1$) may represent an estimated output speed acceleration limit configured to inhibit application of the selectable one-way clutch 23a when the vehicle speed, output speed acceleration, or the slip across the selectable one-way clutch 23a is sufficient to potentially cause damage to the selectable one-way clutch 23a upon application thereof despite the ABS 36 being active. If the ABS 36 is active, the ABS signals are reliable (i.e., ABS Data Ready TRUE), and the estimated output speed acceleration is less than or equal to the first threshold ($K_1$), the selectable one-way clutch inhibiting command may be set to TRUE at 330, thereby restricting the selectable one-way clutch 23a from being applied.

If any one of the three criteria of 314 is not met, the estimated output speed acceleration is compared to a second threshold ($K_2$; 632 in FIG. 8) at 316. In some embodiments, the second threshold ($K_2$) may represent an estimated output speed acceleration limit configured to inhibit application of the selectable one-way clutch 23a when the vehicle operation is such to potentially cause damage to the selectable one-way clutch 23a upon application thereof when considered under specific conditions discussed hereinafter (e.g., without application of the ABS 36). If the estimated output speed acceleration is greater than the second threshold ($K_2$), then the selectable one-way clutch inhibiting command may be set to FALSE at 326, and the selectable one-way clutch 23a may function normally.

If the estimated output speed acceleration is less than or equal to the second threshold ($K_2$), then various determinations may be made at one or more of 318, 320, 322, and 324 to determine if the specific conditions mentioned previously are present. Specifically, if a determination is made at 318 whether the ABS 36 has failed, at 320 whether active dynamic vehicle testing is being performed, at 322 whether the ABS 36 is not active and the ABS signals are reliable, or at 324 whether the ABS signals are unreliable, then the selectable one-way clutch inhibiting command may be set to TRUE at 330, thereby restricting the selectable one-way clutch 23a from being applied. Otherwise, the selectable one-way clutch inhibiting command may be set to FALSE at 328, and the selectable one-way clutch 23a may function normally. The method 300 may end at 332.

Figure 5:
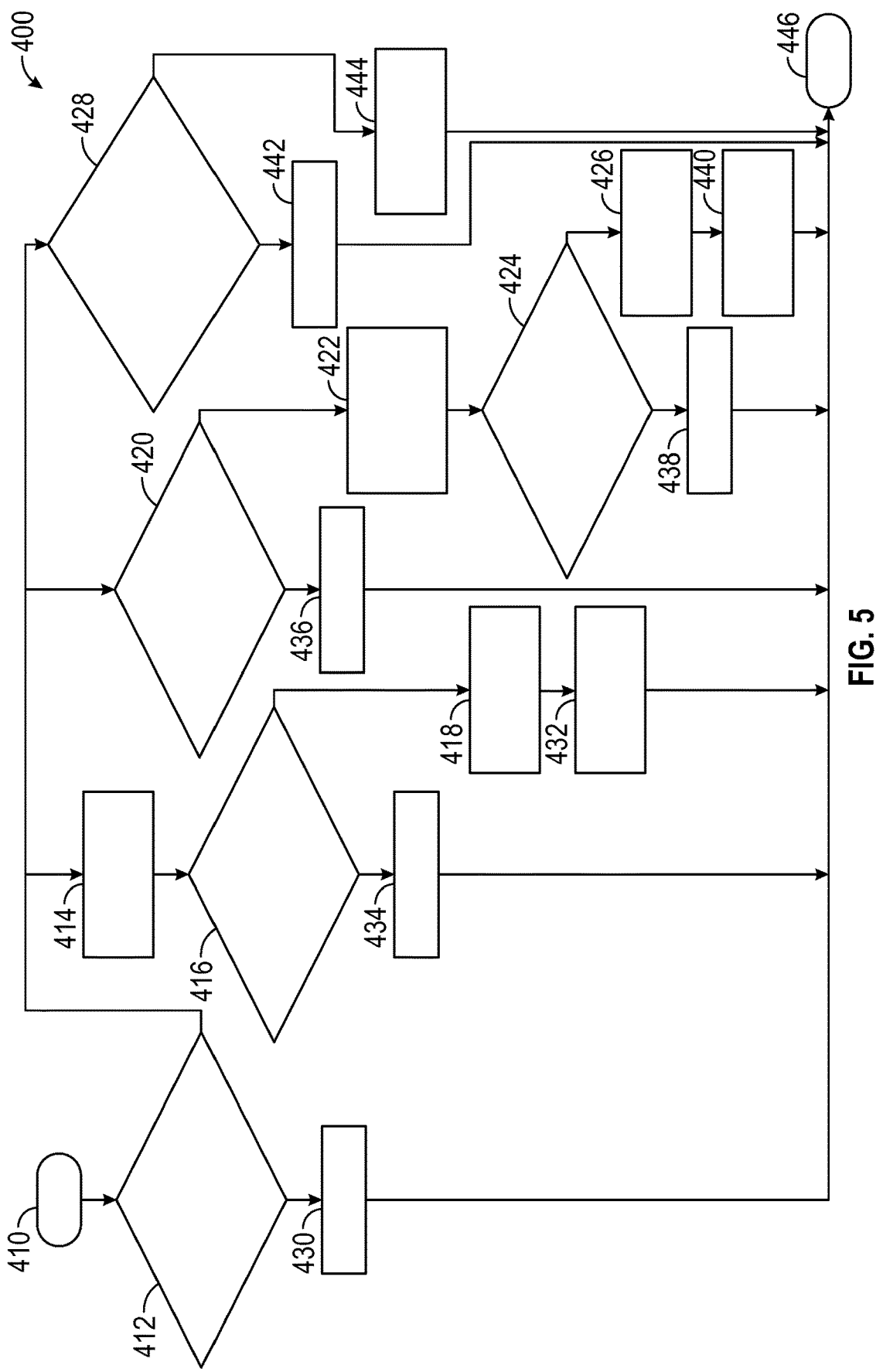
FIG. 5 is a flowchart of a method for determining whether to transition to normal operation of the selectable one-way clutch after the system has restricted application thereof as performed by the system of the vehicle of FIGS. 1 and 2, in accordance with exemplary embodiments.

Referring to FIG. 5, a method 400 is presented for determining whether to transition to normal operation of the selectable one-way clutch 23a after the system 100 has restricted application thereof (e.g., the selectable one-way clutch inhibiting command is set to TRUE in response to detection of the deceleration event). The method 400 may start at 410. At 412, the status of the selectable one-way clutch inhibiting command is determined. If set to FALSE, no action is performed at 430. If set to TRUE, a first timer (overall event timer; $T_1$) is started or updated at 414. At 416, if the first timer ($T_1$) is greater than or equal to an overall event timeout threshold ($L_1$; 640 in FIG. 8), then the first timer ($T_1$) is set to the overall event timeout threshold ($L_1$) at 418 and the selectable one-way clutch inhibiting command may be reset to FALSE at 432, and the selectable one-way clutch 23a may function normally. If the first timer ($T_1$) is less than the overall event timeout threshold ($L_1$), no action is performed at 434.

If the selectable one-way clutch inhibiting command is set to TRUE at 412, the estimated output speed acceleration is compared to a third threshold ($K_3$; 634 in FIG. 8) at 420. In various embodiments, the third threshold ($K_3$) has a non-negative value. If the estimated output speed acceleration is less than or equal to the third threshold ($K_3$), no action is performed at 436. If the estimated output speed acceleration is greater than the third threshold ($K_3$), a second timer (hysteresis timer; $T_2$) is started or updated at 422. At 424, if the second timer ($T_2$) is greater than or equal to a hysteresis timeout threshold ($L_2$; 642 in FIG. 8), then the second timer ($T_2$) is set to the hysteresis timeout threshold ($L_2$) at 426 and the selectable one-way clutch inhibiting command may be reset to FALSE at 440, and the selectable one-way clutch 23a may function normally. If the second timer ($T_2$) is less than the hysteresis timeout threshold ($L_2$), no action is performed at 438.

If the selectable one-way clutch inhibiting command is set to TRUE at 412, a determination is made at 428 whether a driver of the vehicle 10 selected a gear range of Reverse and whether the commanded gear is Reverse. If so, the selectable one-way clutch inhibiting command is set to FALSE at 444. Otherwise, no action is performed at 442. The method 400 may end at 446.

Figure 6:
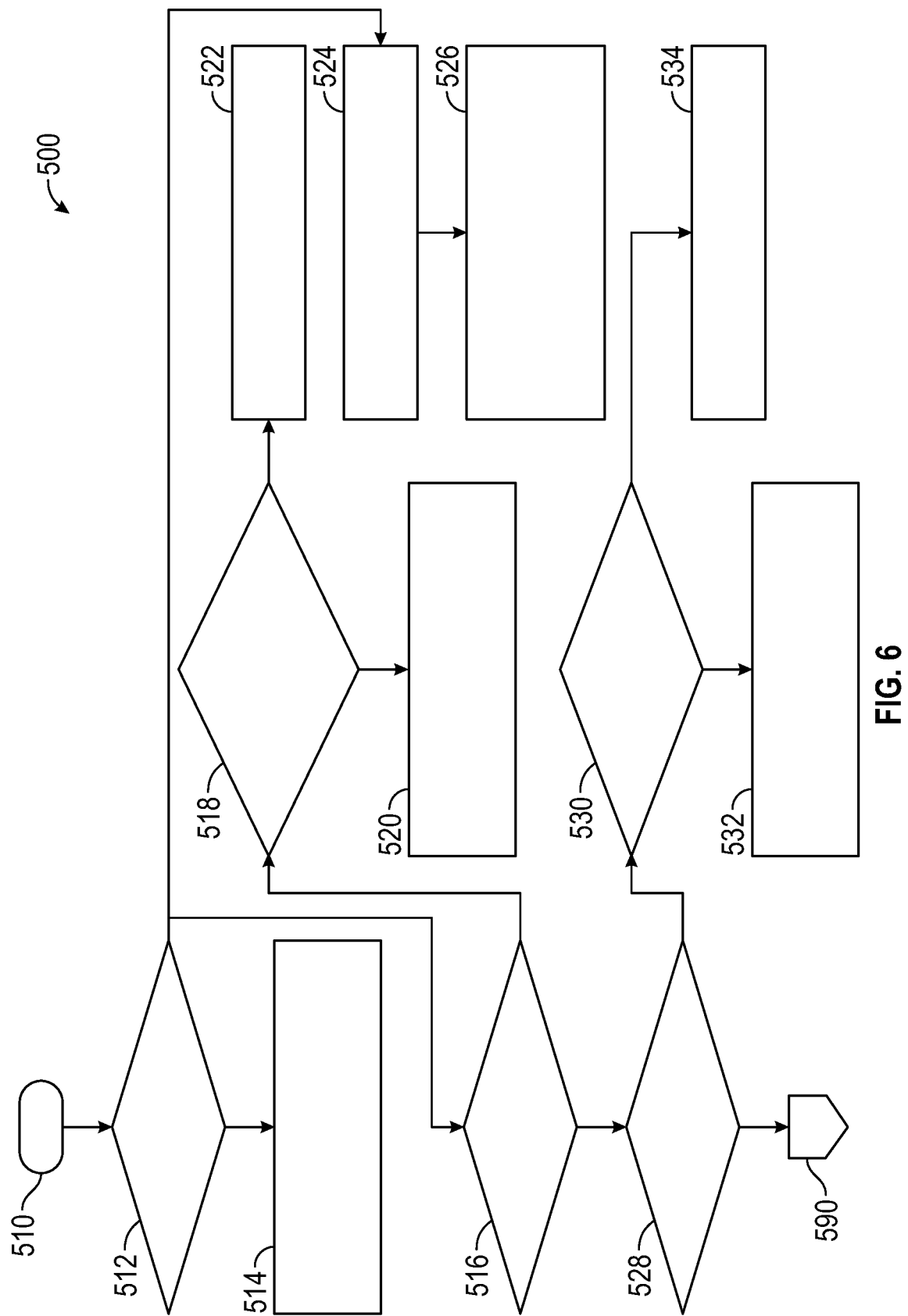
FIGS. 6 and 7 are flowcharts of a method for determining actions to perform during deceleration events as performed by the system of the vehicle of FIGS. 1 and 2, in accordance with exemplary embodiments.
Figure 7:
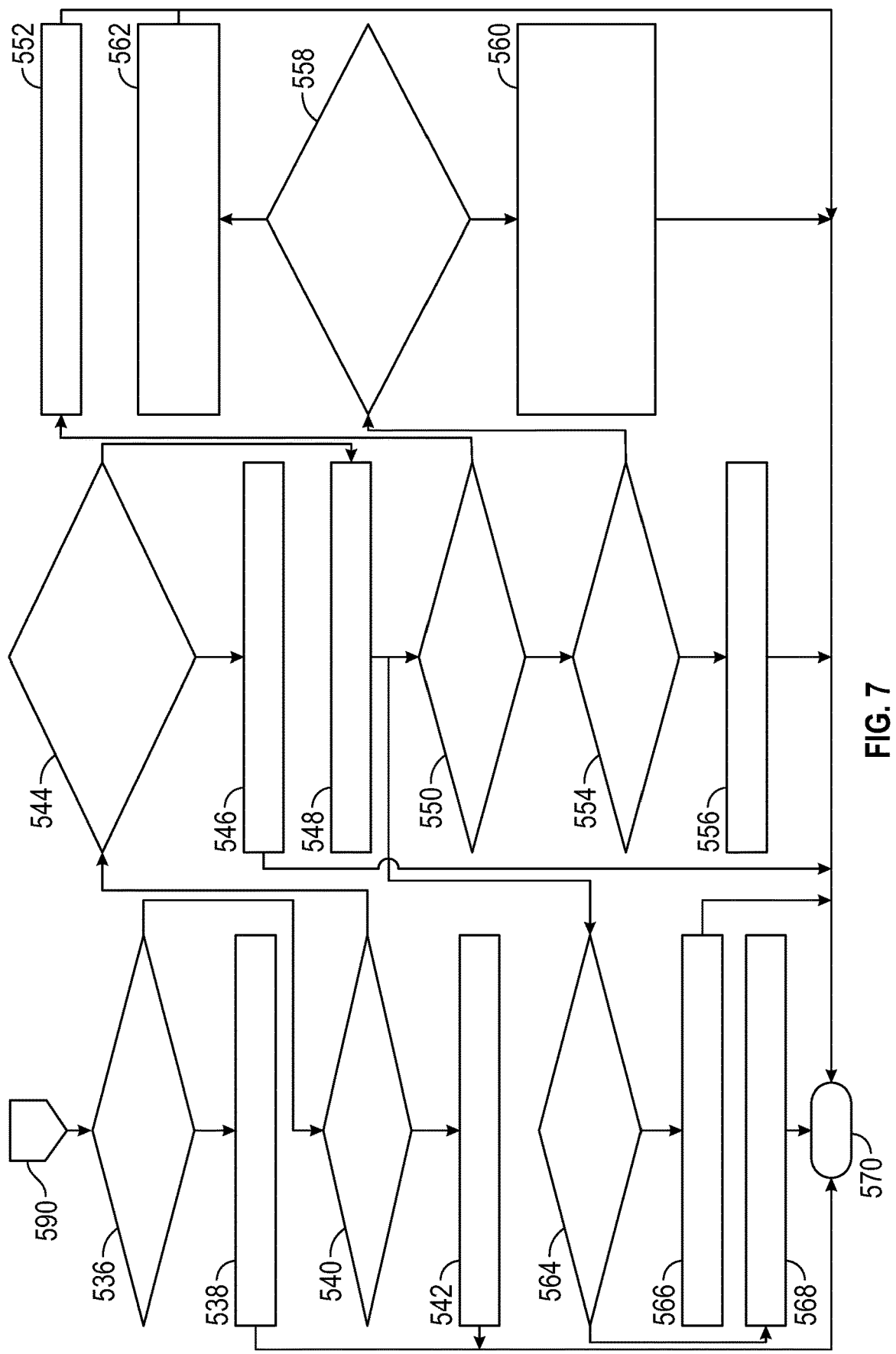
Figure 8:
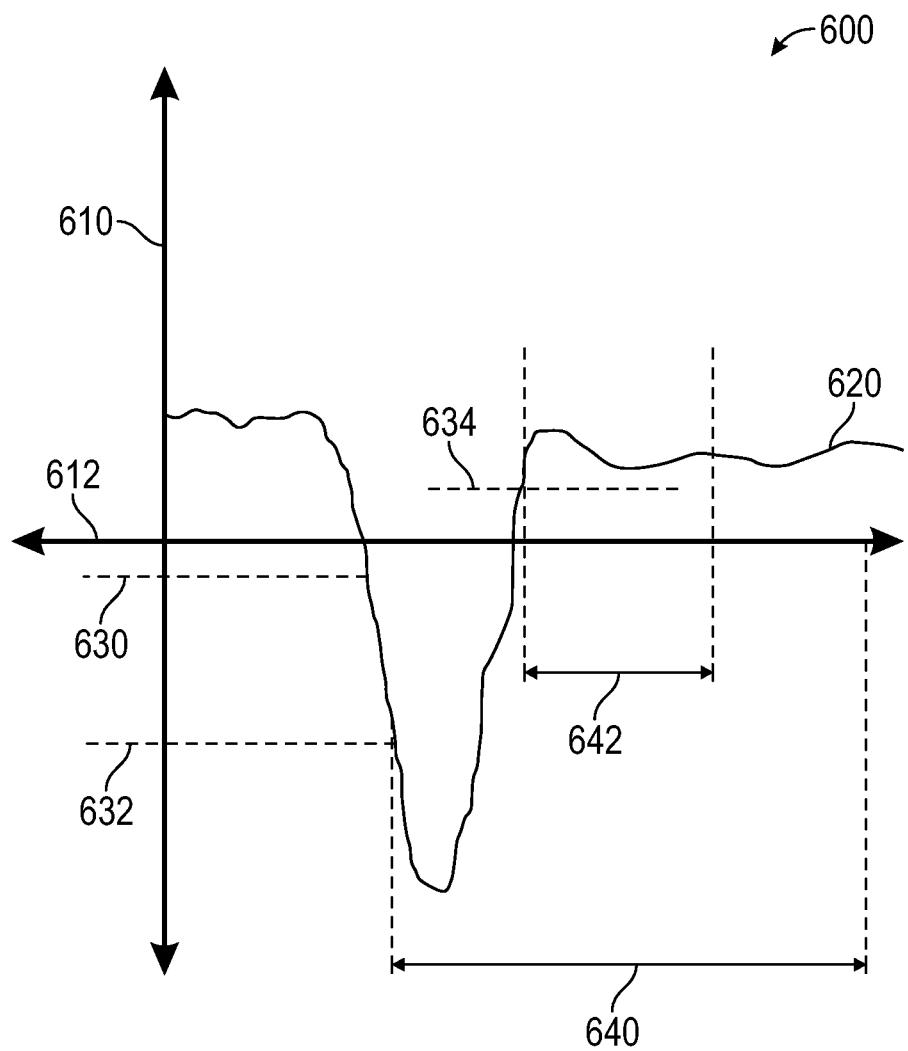
FIG. 8 is a plot depicting estimated output speed acceleration (y-axis) relative to time (x-axis) during an exemplary deceleration event of the vehicle of FIGS. 1 and 2, in accordance with exemplary embodiments.
Figure 9:
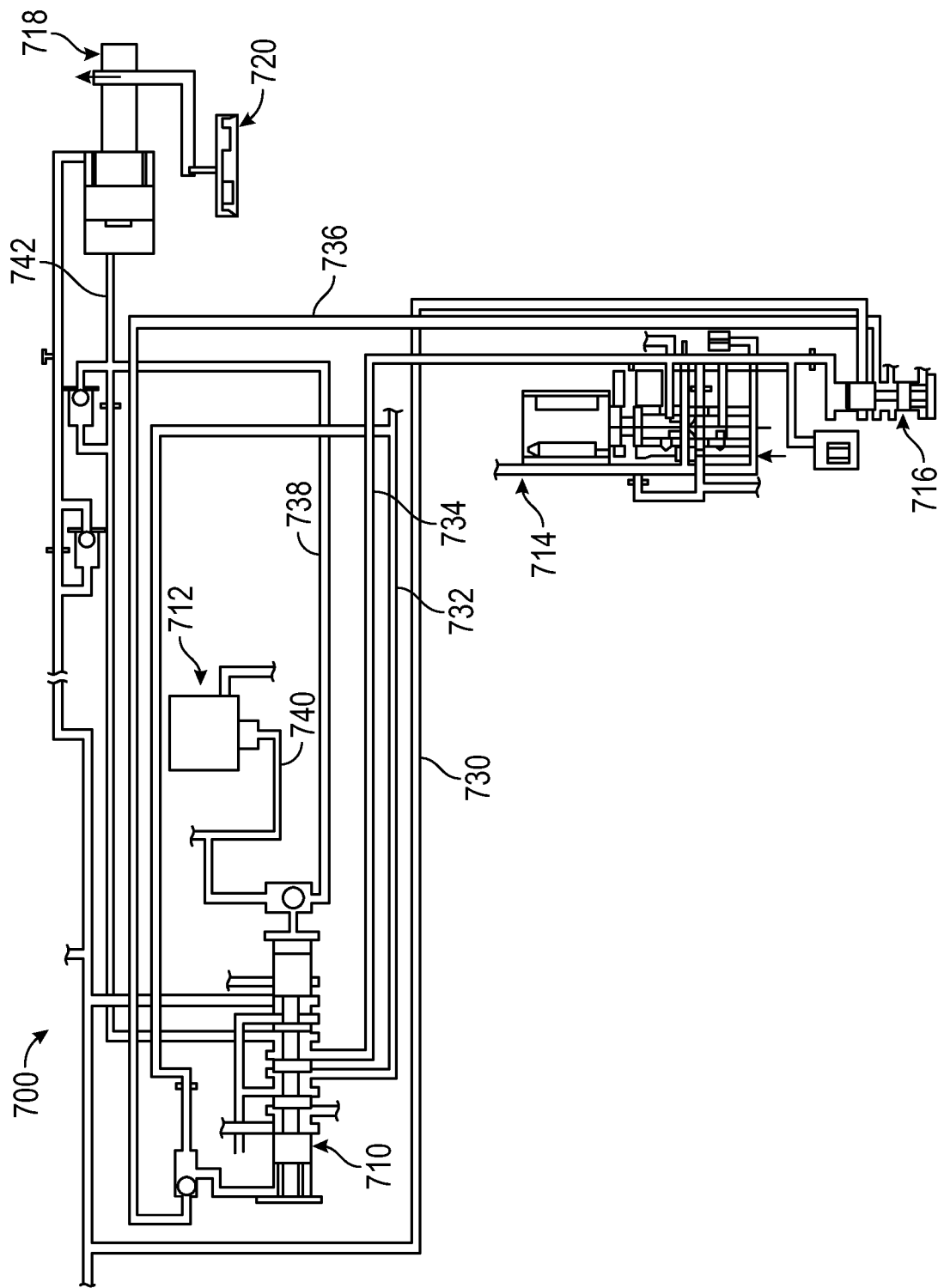
FIG. 9 is a schematic diagram of a hydraulic system for controlling the selectable one-way clutch of the vehicle of FIGS. 1 and 2 in accordance with exemplary embodiments.

Referring to FIGS. 6 and 7, a method 500 is presented for determining actions to perform during deceleration events for a hydraulic system similar to that represented in FIG. 9. Specifically, FIG. 9 represents a portion of a hydraulic system 700 configured for controlling operation of a selectable one-way clutch 720 of a transmission (e.g., the transmission 22) between a release position wherein a strut of the selectable one-way clutch 23a is not engaged and an apply position wherein the strut of the selectable one-way clutch 23a is engaged. The hydraulic system 700 includes various components operably coupled by a hydraulic circuit including fluid lines 730, 732, 734, 736, 738, 740, and 742 that contain a hydraulic fluid. For example, the components of the hydraulic system 700 include a clutch select servo piston 718 configured to control a position of the selectable one-way clutch 720, a clutch select valve 710, a clutch select solenoid 712, a clutch select regulator valve 714, and a latch valve 716 configured to shuttle the clutch select valve 710. In general, the clutch select solenoid 712 may be turned on to cause the clutch select valve 710 and the latch valve 716 to increase the hydraulic pressure to apply the selectable one-way clutch 720 via the clutch select servo piston 718, and may be turned off to cause the clutch select valve 710 and the latch valve 716 to decrease the hydraulic pressure to release the selectable one-way clutch 720 via the clutch select servo piston 718.

The method 500 may start at 510. At 512, the status of the selectable one-way clutch inhibiting command is determined. If the selectable one-way clutch inhibiting command is set to FALSE at 512, no action is performed at 514 and the system 100 allows for the execution of the normal sequencing logic, Change of Mind logic, selectable one-way clutch logic, and/or latch valve logic. If the selectable one-way clutch inhibiting command is set to TRUE at 512, a pressure command of the selectable one-way clutch 720 is set at 524 to either zero or to an exhaust pressure of the vehicle 10. Once the pressure command is set to zero, the actual hydraulic pressure across the selectable one-way clutch 720 is reduced to zero by the following sequence of operations: a) a solenoid that controls the clutch select regulator valve 714 is shut off, b) the latch valve 716 transitions to an installed position, c) the clutch select solenoid 712 is shut off which allows the clutch select valve 710 to transition to an installed position, d) once the clutch select valve 710 has moved to the installed position, a feed pressure of the selectable one-way clutch 720 exhausts faster via an exhaust backfill chamber of the clutch select valve 710 and the hydraulic fluid feeds a backside of the selectable one-way clutch 720. The latch valve 716 is transitioned to the installed position and the clutch select valve 710 is also transitioned to the installed position by the above mechanism to exhaust the actual hydraulic pressure across the selectable one-way clutch 720 to zero and also to disable the capability of changing the hydraulic pressure after the hydraulic pressure has been reduced. In addition to the above, if the selectable one-way clutch inhibiting command is set to TRUE at 512, the state of the range selection device 35 of the transmission 22 is determined at 516, 528, and/or 536.

At 516, if the range selection device 35 is set to neutral, a determination is made as to which neutral gear is set at 518. If the scheduled gear state is neutral with the selectable one-way clutch 23a engaged or applied at 518, the scheduled gear state is set or overridden to neutral with no clutches 23 applied or engaged at 522. If the scheduled gear state is not neutral with the selectable one-way clutch 23*a* engaged at 518, no action is taken at 520 and the scheduled gear is set to a neutral gear based on an existing sequencing logic.

At 528, if the range selection device 35 is set to drive, a determination is made as to which gear is set at 530. If the scheduled gear state is first gear locked, the scheduled gear state is set or overridden to first gear freewheel at 534. If the scheduled gear state is not first gear locked, no action is taken at 532 and the scheduled gear is set to a forward gear based on an existing sequencing logic. If the transmission 22 is not in neutral at 516, and is not in drive at 528, the method 500 continues from FIG. 6 to FIG. 7 via 590.

At 536, if a Manual mode of the transmission 22 is active, a check is made at 540 to determine whether the Manual mode range is first gear manual (M1). If not, no action is taken at 542 and the existing logic is allowed to execute. If the range is first gear manual (M1), the scheduled gear state is determined at 544. If the scheduled gear state is first gear freewheel and the attained gear state is less than or equal to second gear, the transmission override command (labeled as Boolean B2 in FIGS. 6 and 7) is set to TRUE at 548. Otherwise, no action is performed at 546.

If the transmission override command is set to TRUE at 548, checks are performed at 550 and 564 to determine the commanded gear state and the attained gear state, respectively.

At 550, if the commanded gear state is first gear freewheel, a change-of-mind or return-to-previous-range command is used to set the transmission 22 to second gear at 552, and thereby override the transmission 22 to second gear to provide engine braking. "Engine braking" is a method for decelerating a vehicle using engine compression so that energy is dissipated without exclusively relying on conventional friction-based brake systems. If the commanded gear state is first gear locked at 554, a determination is performed as to whether the pressure command of the selectable one-way clutch 720 was set to maximum pressure during the applying phase at 558. If so, the return-to-previous-range command is used at 560 to change the transmission 22 to neutral with no clutches 23 applied and then to second gear. In this case, the return-to-previous-range command is executed via an intermediate neutral state to protect the selectable one-way clutch 720 and the transmission 22 from a full output tie-up. Otherwise, the return-to-previous-range command is used at 562 to change the transmission 22 directly to second gear. If the commanded gear state is not first gear freewheel at 550 or first gear locked at 554, then no action is performed at 556.

At 564, if the attained gear state is greater than second gear and the Manual mode is active and the range thereof is greater than second gear manual (M2), a transmission override command is set to FALSE at 568. Otherwise, no action is performed at 566.

If the transmission 22 is not in Neutral at 516, not in Drive at 528, and the Manual mode is not active at 536, then the transmission override command is set to FALSE at 538. The method 500 may end at 570.

The system 100 provides various benefits over conventional systems that includes a transmission having a selectable one-way clutch. For example, automatic transmissions that employ a high pressure hydraulic control system to actuate the selectable one-way clutch may have inherent hydraulic delays which can result in damage to the selectable one-way clutch, such as during medium-to-heavy deceleration events with wheel lock-up leading to high slip-speed engagement. The system 100 reduces the likelihood of high speed-slip engagements of selectable one-way clutches during deceleration events by monitoring for a deceleration event wherein an estimated output speed acceleration of the vehicle, determined based on signals from the sensor system, is reduced below a first threshold, receiving a status of the anti-lock brake system (ABS) of the vehicle indicating whether the anti-lock brake system (ABS) is active or inactive, and output one or more control signals to command the transmission to inhibit application of the selectable one-way clutch in response to detection of the deceleration event when the selectable one-way clutch is not applied, and the estimated output speed acceleration of the vehicle is either: (i) below the first threshold while the anti-lock brake system (ABS) of the vehicle is active, or (ii) below a second threshold while the anti-lock brake system (ABS) is inactive, wherein the first threshold is greater than the second threshold. In this manner, the system 100 reduces the likelihood that the selectable one-way clutch will be applied during medium-to-heavy deceleration events with wheel lock-up. Accordingly, the system 100 provides a significant improvement to transmissions having a selectable one-way clutch.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for controlling a transmission of a vehicle that has a selectable one-way clutch, the system comprising:
   a sensor system comprising one or more sensors configured to sense an observable condition of the vehicle;
   an anti-lock brake system (ABS); and
   a controller configured to, by a processor:
      monitor for a deceleration event wherein an estimated output speed acceleration of the vehicle, determined based on the observable condition sensed by the sensor system, is reduced below a first threshold;
      receive a status of the anti-lock brake system (ABS) of the vehicle indicating whether the anti-lock brake system (ABS) is active or inactive; and
      output one or more control signals to command the transmission to inhibit application of the selectable one-way clutch in response to detection of the deceleration event when the selectable one-way clutch is not applied, and the estimated output speed acceleration of the vehicle is either: (i) below the first threshold while the anti-lock brake system (ABS) of the vehicle is active, or (ii) below a second threshold while the anti-lock brake system (ABS) is inactive, wherein the first threshold is greater than the second threshold.

2. The system of claim 1, wherein the controller is configured to, by the processor:
   calculate the estimated output speed acceleration of the vehicle based on the observable condition sensed by the sensor system;

receive sensed wheel speed for wheels of the vehicle; and
receive dynamic vehicle test (DVT) information.

3. The system of claim 1, wherein the one or more of control signals are configured to:
reduce a hydraulic pressure of a hydraulic circuit of the vehicle such that the selectable one-way clutch is transitioned to a release position wherein a strut of the selectable one-way clutch is not engaged; and
disable a capability of changing the hydraulic pressure after the hydraulic pressure is reduced.

4. The system of claim 1, wherein the controller is configured to, by the processor:
change a gear state of the transmission by setting or overriding a commanded gear state of the transmission to neutral with no clutches applied when a range selection device configured to select an operating range of the transmission is set to neutral and a scheduled gear state of the transmission is neutral with the selectable one-way clutch engaged or applied; or
change the gear state by setting or overriding the commanded gear state of the transmission to first gear freewheel when the range selection device is set to drive and the scheduled gear state of the transmission is first gear locked.

5. The system of claim 1, wherein the controller is configured to, by the processor, output one or more additional control signals to command the transmission to provide engine braking by changing a gear state of the transmission in response to outputting the one or more control signals.

6. The system of claim 5, wherein the transmission includes a Manual mode configured to allow an operator to manually change the gear state of the transmission, wherein the controller is configured to, by the processor, change the gear state by setting or overriding a commanded gear state of the transmission to second gear when the Manual mode is active, a gear range of the transmission is first gear manual (M1), a scheduled gear state of the transmission is first gear freewheel, and an attained gear state of the transmission is less than or equal to second gear.

7. The system of claim 6, wherein after setting or overriding the commanded gear state of the transmission to second gear, the controller is configured to, by the processor, execute a change-of-mind or return-to-previous-range command to command the transmission to second gear when the commanded gear state is first gear freewheel.

8. The system of claim 6, wherein setting or overriding the commanded gear state of the transmission to second gear, the controller is configured to, by the processor, to end the setting or overriding of the commanded gear state of the transmission to second gear when the attained gear state of the transmission is greater than second gear, the Manual mode is active, and the gear range of the Manual mode is greater than second gear manual (M2).

9. The system of claim 1, wherein the controller is configured to, by the processor:
initiate an overall event timer in response to automatically inhibiting the application of the selectable one-way clutch;
initiate a hysteresis timer if the estimated output speed acceleration is greater than a third threshold;
monitor for a selection of a gear range of reverse and a commanded gear state of reverse; and
output one or more additional control signals to command the transmission to cease inhibition of the application of the selectable one-way clutch in response to the overall event timer being greater than or equal to an overall event timeout threshold, the hysteresis timer being greater than or equal to a hysteresis timeout threshold, or the detection of the selection of the gear range of reverse and the commanded gear state of reverse.

10. A method for a vehicle having a transmission with a selectable one-way clutch, the method comprising:
receiving an observable condition of the vehicle sensed by a sensor system;
receiving a status of an anti-lock brake system (ABS) of the vehicle indicating whether the anti-lock brake system (ABS) is active or inactive;
monitoring, by a processor, for a deceleration event wherein an estimated output speed acceleration of the vehicle, determined based on the observable condition sensed by the sensor system, is reduced below a first threshold; and
outputting, by the processor, one or more control signals to command the transmission to inhibit application of the selectable one-way clutch in response to detection of the deceleration event when the selectable one-way clutch is not applied, and the estimated output speed acceleration of the vehicle is either: (i) below the first threshold while the anti-lock brake system (ABS) of the vehicle is active, or (ii) below a second threshold while the anti-lock brake system (ABS) is inactive, wherein the first threshold is greater than the second threshold.

11. The method of claim 10, wherein monitoring for the deceleration event includes:
calculating, by the processor, the estimated output speed acceleration of the vehicle based on the observable condition sensed by the sensor system;
receiving, by the processor, sensed wheel speed for wheels of the vehicle; and
receiving, by the processor, dynamic vehicle test (DVT) information.

12. The method of claim 10, wherein the one or more of control signals are configured to:
reduce a hydraulic pressure of a hydraulic circuit of the vehicle such that the selectable one-way clutch is transitioned to a release position wherein a strut of the selectable one-way clutch is not engaged; and
disable a capability of changing the hydraulic pressure after the hydraulic pressure is reduced.

13. The method of claim 10, further comprising:
setting or overriding, by the processor, a commanded gear state of the transmission to neutral with no clutches applied when a range selection device configured to select an operating range of the transmission is set to neutral and a scheduled gear state of the transmission is neutral with the selectable one-way clutch engaged or applied; or
setting or overriding, by the processor, the commanded gear state of the transmission to first gear freewheel when the range selection device is set to drive and the scheduled gear state of the transmission is first gear locked.

14. The method of claim 10, further comprising outputting, by the processor, one or more additional control signals to command the transmission to provide engine braking by changing a gear state of the transmission in response to outputting the one or more control signals.

15. The method of claim 14, wherein the transmission includes a Manual mode configured to allow an operator to manually change the gear state of the transmission, wherein changing the gear state includes setting or overriding, by the processor, a commanded gear state of the transmission to second gear when the Manual mode is active, a gear range of the transmission is first gear manual (M1), a scheduled gear state of the transmission is first gear freewheel, and an attained gear state of the transmission is less than or equal to second gear.

16. The method of claim 15, wherein after setting or overriding the commanded gear state of the transmission to second gear, the method includes executing, by the processor, a change-of-mind or return-to-previous-range command to command the transmission to second gear when the commanded gear state is first gear freewheel.

17. The method of claim 15, wherein after setting or overriding the commanded gear state of the transmission to second gear, the method includes ending, by the processor, the setting or overriding of the commanded gear state of the transmission to second gear when the attained gear state of the transmission is greater than second gear, the Manual mode is active, and the gear range of the Manual mode is greater than second gear manual (M2).

18. The method of claim 10, further comprising:
   initiating, by the processor, an overall event timer in response to automatically inhibit the application of the selectable one-way clutch;
   initiating, by the processor, a hysteresis timer if the estimated output speed acceleration is greater than a third threshold;
   monitoring, by the processor, for a selection of a gear range of reverse and a commanded gear state of reverse; and
   outputting, by the processor, one or more additional control signals to command the transmission to cease inhibition of the application of the selectable one-way clutch in response to the overall event timer being greater than or equal to an overall event timeout threshold, the hysteresis timer being greater than or equal to a hysteresis timeout threshold, or the detection of the selection of the gear range of reverse and the commanded gear state of reverse.

19. A vehicle comprising:
   a transmission comprising a selectable one-way clutch;
   a sensor system comprising one or more sensors configured to sense an observable condition of the vehicle;
   an anti-lock brake system (ABS); and
   a controller configured to, by a processor:
      monitor for a deceleration event wherein an estimated output speed acceleration of the vehicle, determined based on the observable condition sensed by the sensor system, is reduced below a first threshold;
      receive a status of the anti-lock brake system (ABS) of the vehicle indicating whether the anti-lock brake system (ABS) is active or inactive; and
      output one or more control signals to command the transmission to inhibit application of the selectable one-way clutch in response to detection of the deceleration event when the selectable one-way clutch is not applied, and the estimated output speed acceleration of the vehicle is either: (i) below the first threshold while the anti-lock brake system (ABS) of the vehicle is active, or (ii) below a second threshold while the anti-lock brake system (ABS) is inactive, wherein the first threshold is greater than the second threshold.

20. The vehicle of claim 19, wherein the transmission comprises a hydraulic circuit configured for transitioning the selectable one-way clutch between a release position wherein a strut of the selectable one-way clutch is not engaged and an apply position wherein the strut of the selectable one-way clutch is engaged, wherein the one or more control signals are configured to:
   reduce a hydraulic pressure such that the selectable one-way clutch is transitioned to the release position;
   disable a capability of changing the hydraulic pressure after the hydraulic pressure has been reduced; and
   provide engine braking by changing a gear state of the transmission.

* * * * *